United States Patent [19]

Chabal

[11] Patent Number: 4,554,713
[45] Date of Patent: Nov. 26, 1985

[54] APPARATUS FOR DIFFERENTIALLY STRETCHING, ALIGNING AND CUTTING SHEET MATERIAL

[75] Inventor: Joseph Chabal, Gibsonia, Pa.

[73] Assignee: PPG Industries, Inc., Pittsburgh, Pa.

[21] Appl. No.: 415,638

[22] Filed: Sep. 7, 1982

[51] Int. Cl.$^4$ .................. B29C 17/02; B29D 7/24
[52] U.S. Cl. .......................... 26/51; 26/72; 26/74; 425/302.1; 425/366
[58] Field of Search .............. 425/366, 302.1; 26/51, 26/72, 74

[56] References Cited

U.S. PATENT DOCUMENTS

| | | |
|---|---|---|
| 2,668,705 | 2/1954 | Rosenthal . |
| 2,937,407 | 5/1960 | Richardson . |
| 3,019,475 | 2/1962 | Smith . |
| 3,696,186 | 10/1972 | Stark et al. . |
| 3,760,669 | 9/1973 | Rosenthal et al. . |
| 3,885,899 | 5/1975 | Gurta et al. . |
| 3,912,440 | 10/1975 | Koss et al. . |
| 3,962,760 | 6/1976 | Koss et al. . |

Primary Examiner—Robert R. Mackey
Attorney, Agent, or Firm—Andrew C. Siminerio; Edward I. Mates

[57] ABSTRACT

Differentially stretched plastic with a dyed border along one side suitable for shaded interlayers of laminated windshields moves in an arcuate path away from a frustoconical roll of a continuously operating differential web stretcher toward an intermittently operated web cutting machine, which tends to veer the web transversely every time it starts to pull a length of web into the cutting machine. The present invention realigns the arcuately shaped web between cutting operations when necessary to compensate for lateral veering of the arcuate plastic web from the arcuate path it takes so as to cause the web to enter the web cutting machine at a proper angle and orientation for cutting.

7 Claims, 11 Drawing Figures

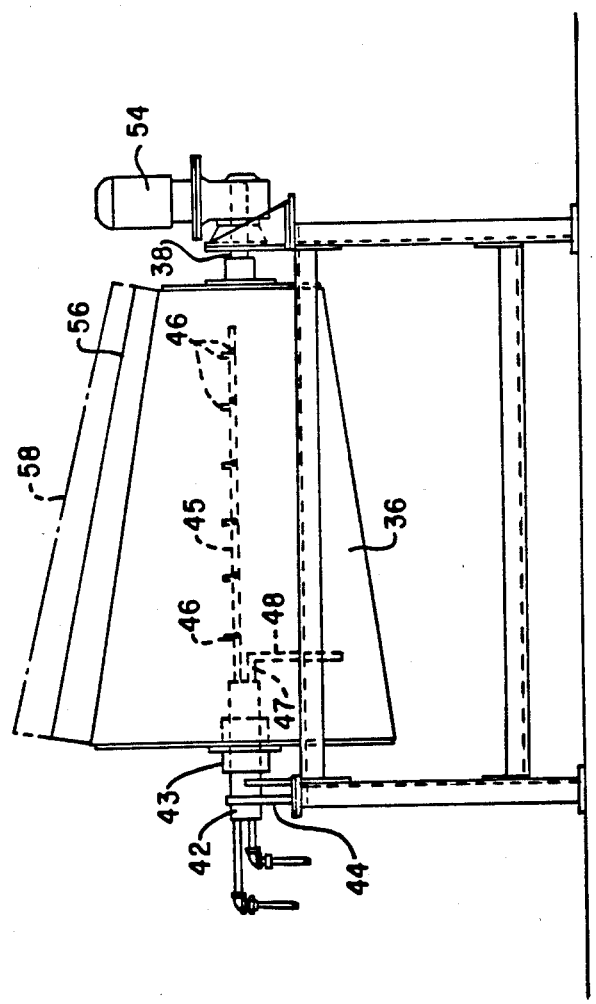

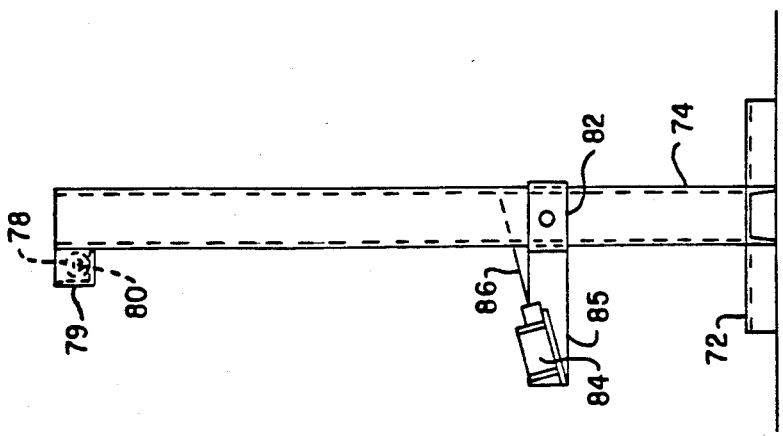
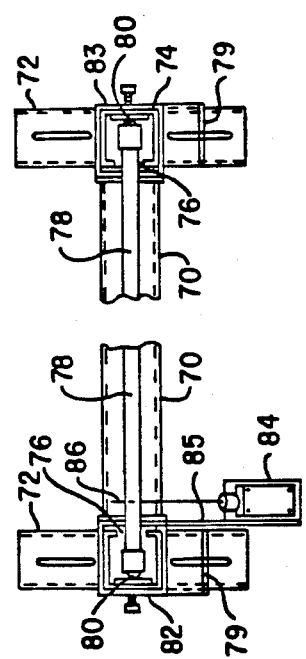
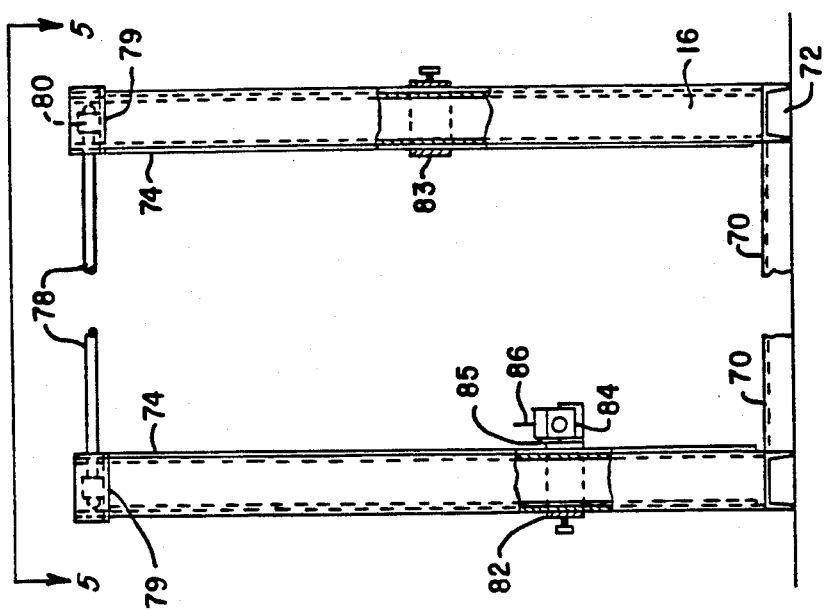

APPARATUS FOR DIFFERENTIALLY STRETCHING, ALIGNING AND CUTTING SHEET MATERIAL

BACKGROUND OF THE INVENTION

1. Field of the Invention

The present invention relates to the alignment of a curved continuous web of plastic interlayer material, particularly a length of differentially stretched plastic interlayer material having a shaded band along one side thereof en route from a continuously operating differential web stretching apparatus to an automatic web cutting apparatus that operates intermittently.

2. Technical Background and Description of Patents of Interest

In the preparation of laminated safety glass for one piece windshields of modern automobiles, a thermoplastic sheet is placed between two curved glass sheets of matching configuration. The two glass sheets are bonded to the opposite sides of the plastic sheet by heat and pressure to form the laminated windshield.

The laminated windshields often have an upper colored portion that reduces glare. This coloration in the thermoplasic interlayer sheet is a colored band which is preferably graduated in intensity with the intensity of coloration decreasing from the top of the windshield so that the line of demarcation between the colored band and the uncolored portion of the interlayer is above the direct line of vision. When the interlayer sheet having a rectilinear colored band is used to make a curved windshield, the line of demarcation between the colored and clear portions appears to droop at the ends. However, it is desirable for esthetic purposes to have the line of demarcation between the colored and uncolored portions of the plastic interlayer appear to be horizontal across the entire length of the windshield from side to side of the automobile.

In the past, continuous lengths of plastic interlayer material with such colored bands have been stretched differentially to produce arcuate side edges and a curved line of demarcation between the colored and uncolored portions. For present automobile windshields, a curved line of constant radius of curvature is acceptable. Different constant radii are suitable for different patterns and means are available to differentially stretch plastic interlayer material to a constant radius of curvature for the line of demarcation. The continuous lengths have been cut by hand into shorter lengths compatible with the length of the curved windshield in which the shorter length of interlayer is installed.

U.S. Pat. No. 2,668,705 to Rosenthal and U.S. Pat. No. 3,760,699 to Rosenthal et al. disclose commercially available machinery for automatically cutting different preselected lengths from a continuous web of a flexible material such as paper. These patented web cutting apparatus comprise a transversely extending cutting knife disposed immediately beyond a web driving roll. These apparatus are suitable for intermittently cutting a continuous web of flexible plastic interlayer material into rectangular lengths and requires some modification to be suitable for use with the present invention.

U.S Pat. No. 2,937,407 to Richardson discloses continuously differentially stretching a web of interlayer material that has a dyed band on a conical mandrel while still in ribbon form to distort the web, then cutting the distorted web into sheets while it is still distorted. The cutting is performed manually.

U.S. Pat. No. 3,019,475 to Smith discloses an apparatus comprising a cylindrical heating roll, a conical heating roll and a conical cooling roll disposed along a movement path for differentially stretching a web of interlayer material as the web moves continuously through a web stretching apparatus containing said rolls disposed in tandem so as to produce a curved line of demarcation between the colored portion and the uncolored portion of the web of interlayer material. After the web is differentially stretched, it must be cut into lengths. In order to minimize the loss of plastic interlayer material, the individual pieces are cut manually into quadrilateral shape with the longer curved longitudinal edge to the uncolored side and the shorter curved longitudinal edge to the other colored side and transverse ends interconnecting the curved longitudinal edges.

U.S. Pat. No. 3,696,186 to Stark et al. discloses apparatus for expanding a web of interlayer material by differential stretching between a cylindrical roll and a conical roll which is then fed manually by an operator into a cutting machine for cutting the differentially stretched web into suitable lengths.

U.S. Pat. No. 3,885,899 to Gurta et al. discloses an apparatus for differentially stretching a web of interlayer material which includes alignment means operated by an edge portion of the moving web throttling an air moving means to control the transverse position of a platform mounting a conical stretching member to insure that the web of material is stretched uniformly along extended lengths thereof as it passes over the conical stretching member which stretches the moving web differentially.

U.S. Pat. Nos. 3,912,440 and 3,962,760 to Koss et al. disclose apparatus for continuously stretching a plastic interlayer material that incorporate the invention of U.S. Pat. No. 3,885,899 in combination with other inventions. A delicate spring loaded valve element is an important feature of the conical roll alignment device of these patents. It would be beneficial to avoid such delicate equipment which is likely to require maintenance and repair. The last three patents are assigned to the same assignee as the Stark et al. patent and fail to show any cutting equipment that differs from the manually operated cutting equipment of the Stark et al. patent.

It would be desirable to avoid the need for excess labor that is involved in manually cutting a web of differentially stretched interlayer material.

A continuous web of plastic interlayer material, when continuously stretched differentially from side to side and fed into an intermittently operated web cutting device, forms a loop within a curved length that moves along a path of movement of the differentially stretched web between the continuous differential web stretcher and intermittently operated web cutting device. Early attempts made to cut automatically lengths of differentially stretched plastic interlayer material using the automatic cutting machine available resulted in frustrations.

The automatic cutting machine of the prior art pulled a desired length of web material along a straight path into a cutting station located immediately downstream of a roll drive forming a nip and then stopped the pulling for a cutting operation. The continuous differential web stretcher, on the other hand, caused the web to move continuously therebeyond along an arcuate path.

Therefore, the portion of the differentially stretched web with arcuately shaped sides of different lengths between the end of the continuous differential stretching apparatus and the automatic cutting apparatus cyclically developed a veer in the curved length transverse to the direction of web movement so that it was difficult to obtain a cut of proper orientation across the width of the web. Also, the web tended to bunch toward one sheet side. Bunching causes the interlayer material to wrinkle, which is detrimental to the optical properties of the resulting laminated window containing the defective interlayer. This and other problems are solved by the present invention as will be described in further detail subsequently.

SUMMARY OF THE INVENTION

The present invention provides a web aligning device comprising a floating rod that has a controlled cyclic movement path of engagement with a loop of changing length that forms from a web portion between a differential web stretcher and a web cutting machine. The rod cyclically engages an adjustable stop member at one end portion and switch means in transversely spaced relation to said stop member. The rod rests on each incremental length of the moving web transversely of the path of movement of the web portion between the differential web stretcher comprising at least one frustoconical roll and the web cutting machine and applies tension to a loop of cyclical length that forms. The rod compensates for transverse misalignment of the web length during each cycle of movement between the continuous differential web stretcher and the intermittent pull of the web cutting machine during every cycle when such compensation is needed. This insures moving the web into a proper position of transverse and angular alignment as the trailing end of each web length reaches the knife of the cutting machine. Furthermore, an optional feature of a preferred embodiment of the present invention has modified the prior art web cutting machine by substituting a tapered drive roll for a cylindrical drive roll previously used. The tapered drive roll helps maintain the nonrectangular web in proper orientation with the knife disposed immediately beyond the tapered drive roll of the modified web cutting apparatus that operates intermittently. In addition, the tapered drive roll of the modified web cutting apparatus of a preferred embodiment of this invention is oriented to have its axis extend to an apex adjacent to an apex for the frustoconical roll at the downstream end of the continuous web stretcher. The cyclically moved rod is provided to apply tension to a loop that cyclically changes in length between the continuous web stretcher and the automatic web cutting apparatus.

The benefits of the various details of the present invention will be understood more clearly in the light of a description of a specific embodiment that follows.

BRIEF DESCRIPTION OF THE DRAWINGS

In the drawings that form part of a description of an apparatus for performing the present invention:

FIG. 3 is an end view of a downstream roll of the differential web stretcher included in the apparatus of FIGS. 1 and 2;

FIG. 4 is a fragmentary elevation view with parts omitted to increase the scale of a simple, mechanical alignment device of the present invention that is incorporated in the apparatus of FIGS. 1 to 3, and taken along the line 4—4 of FIG. 1;

FIG. 5 is a fragmentary plan view of the alignment device taken along line 5—5 of FIG. 4;

FIG. 6 is a side elevation of the alignment device depicted in FIG. 4;

DESCRIPTION OF THE PREFERRED EMBODIMENT

Figure 1:
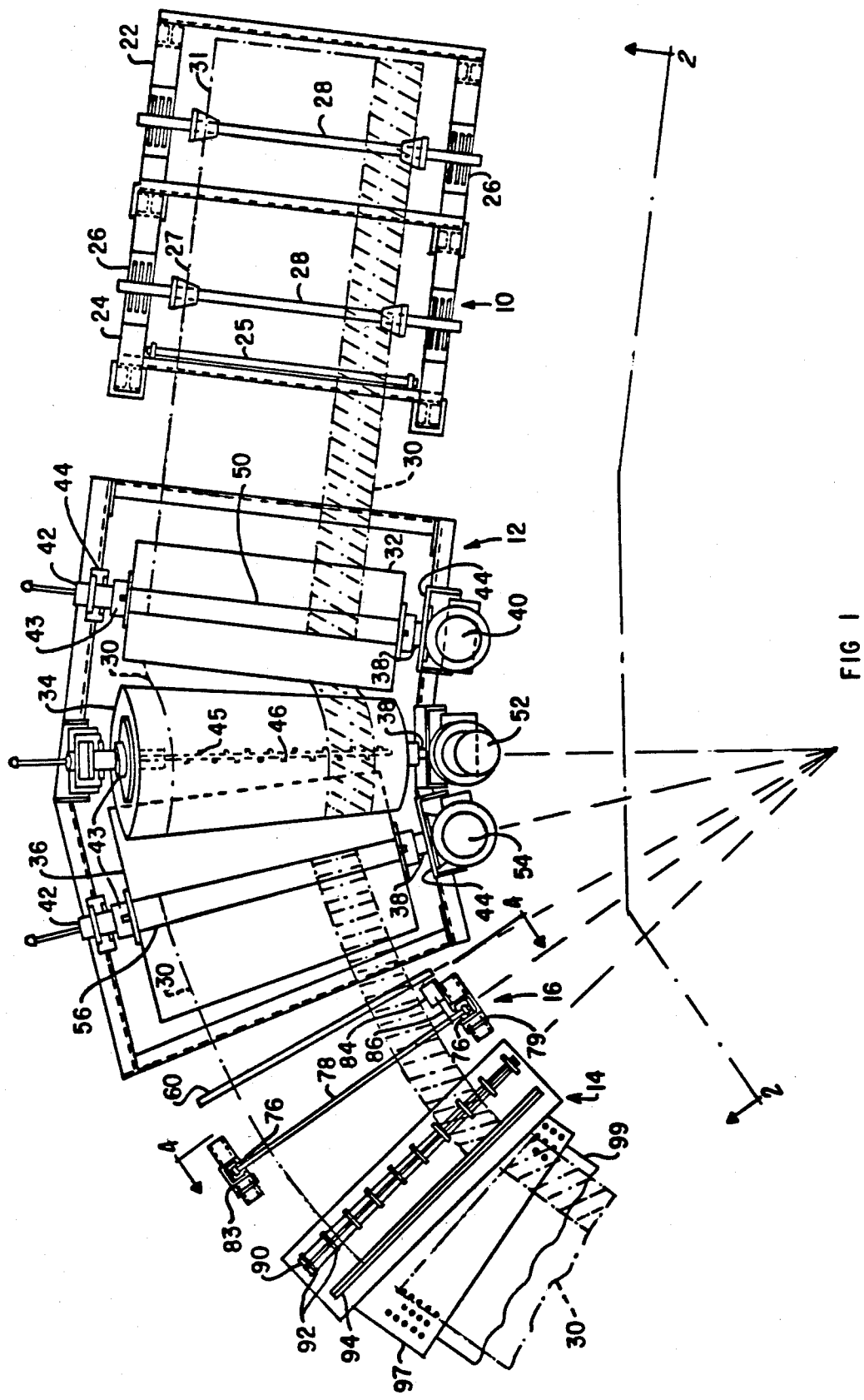
FIG. 1 is a plan view showing how a web aligning mechanism of the present invention is arranged between a continuously operating differential web stretcher and an intermittent web cutting device modified according to the present invention.

Referring to the drawings, apparatus for aligning partially dyed interlayer material according to a preferred embodiment of the present invention is used in conjunction with a differential web stretcher, such as continuously running dyed plastic interlayer stretching apparatus that is conventional and preferably of the type depicted in U.S. Pat. No. 3,019,475 to William G. Smith and with intermittently operating flexible web cutting apparatus similar to that depicted in U.S. Pat. No. 2,668,705 to Harry Rosenthal or U.S. Pat. No. 3,760,669 to Ben J. Rosenthal et al. and modified in a manner to be described later. Many details of the patented stretching apparatus and those of the patented cutting apparatus described in the patents are incorporated in the present application by reference and only details necessary to understand the working of the present invention will be incorporated in the present description for the sake of brevity. The patents mentioned can be referred to for more precise description of details.

However, while the specific apparatus described uses differential web stretching apparatus of the Smith patent and automatic cutting apparatus based on modifications of the Rosenthal patents, it is understood that the alignment device of the present invention may be used in combination with any continuous differential stretching apparatus that causes a continuous web of plastic interlayer material to develop arcuate side edges, such as those disclosed in the aforementioned patents to Stark et al., Gurda et al. and Koss et al. The combination apparatus that incorporates the novel alignment device of this invention may incorporate any automatic web cutting apparatus that includes a drive roll to accumulate a given length of web to be cut and a cutting means disposed in combination with the drive roll.

The system incorporating the web alignment device of the present invention does not necessarily include all the elements of the patented apparatus combined therewith, but a preferred embodiment comprises a loading station 10 and a differential web stretcher 12 in end to end relation along a path of movement for a thin, elongated, continuous, flexible web of interlayer material such as polyvinyl butyral plasticized with a suitable plasticizer and sold by DuPont under the trademark Butacite ® B-140 or a similar product sold by Monsanto under the trademark Saflex ® TL. A web cutting machine 14 is located in spaced relation to the downstream end of the differential web stretcher 12. A web alignment device 16 conforming to the present invention is interposed in a preferred position of orientation across the path of movement of a differentially stetched web between the downstream end of the differential web stretcher 12 and the upstream end of the web cutting machine 14.

The loading station 10 comprises a frame structure 20 comprising upstream lower support beams 22 and downstream upper support beams 24 and a pair of guide rolls 25 supported near the downstream end of the loading station 10. Each upstream lower support beam 22 and each downstream upper support beam 24 has a pair of trunnion supports 26. The latter support a supply roll 27 by receiving the opposite end portions of a spindle 28 about which the supply roll 27 is mounted. The roll is composed of a continuous web 30 of interlayer material. The upstream lower support beams 22 contain pairs of trunnion supports 26 for the spindle of a spare roll 31 of interlayer material while the continuous web 30 is unwound from the supply roll 27. The web 30 extends downstream from the supply roll 27 through the guide rolls 25 toward and into the differential web stretcher 12.

It is understood that the spare roll 31 is mounted adjacent the supply roll 27 for convenience in splicing the ends of webs 30 to one another. When the supply roll 27 is depleted, the spare roll 31 becomes the supply roll for the continuous differential web stretcher 12, the spindle 28 of the depleted supply roll 27 is removed and a new roll replaces the removed roll on support beam 24 without interfering with the removal of the continuous web 30 from the spare roll 31, which has become the supply roll.

Figure 2:
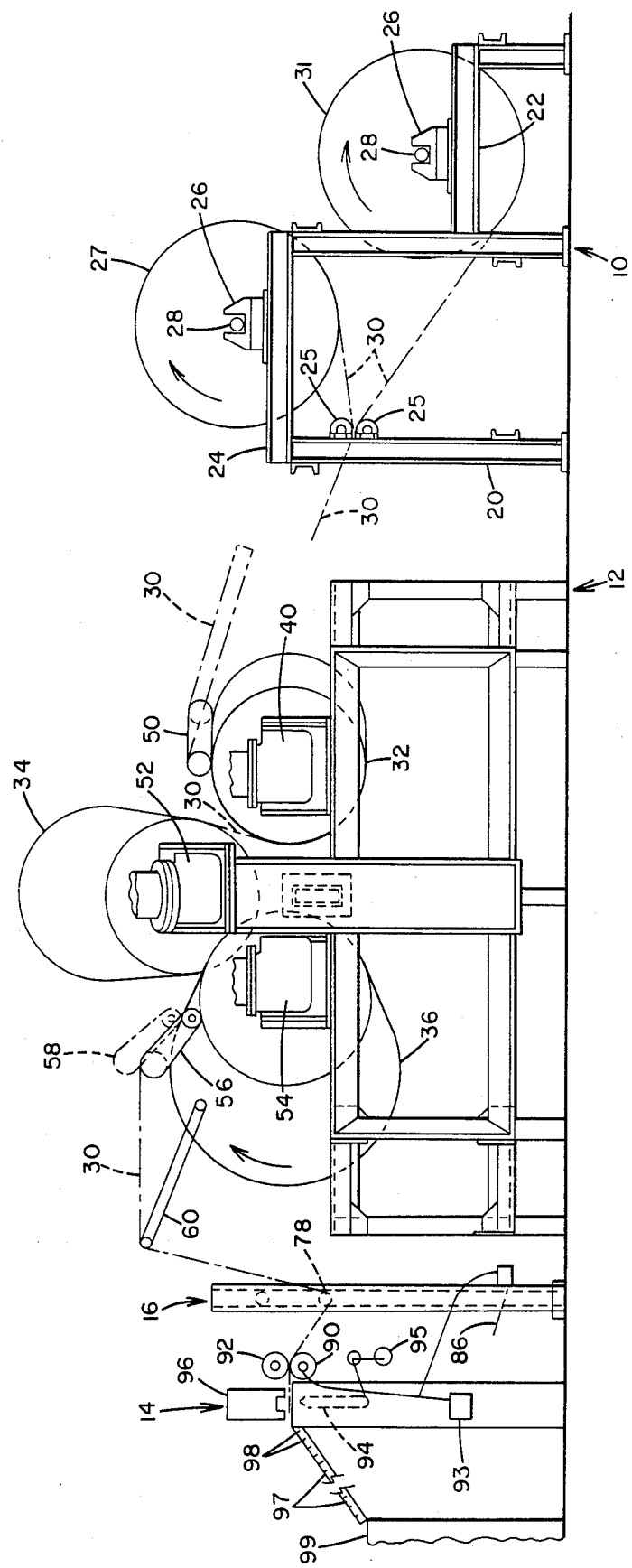
FIG. 2 is a side view taken along the jagged line 2—2 of FIG. 1.

The differential web stretcher 12 comprises a cylindrical heating roll 32 mounted for rotation about an axis extending in a given plane obliquely downstream of a path of web movement, a first frustoconical roll 34 that is heated and a second frustoconical roll 36 that is cooled. The first frustoconical roll 34 is mounted on an axis in a plane transversely oblique to said path and overlaps rolls 32 and 36. Both of the latter are preferably mounted on horizontally extending axes of rotation for convenience, although any pair of axes in a common plane would be suitable. The rolls 32 and 34 are rotatably mounted so that the angle between the axis of cylindrical roll 32 and the axis of first frustoconical roll 34 is equal to the included angle of the cone of which the roll 34 is a frustum. Rolls 32 and 34 are mounted so that the distance between them at the smaller end of frustoconical roll 34 is not much greater than the thickness of web 30. The maximum distance between them at this end is preferably about one inch (2.5 mm). Because rolls 32 and 34 are mounted as specified, the larger end of roll 34 is a substantially greater distance from the corresponding end of roll 32 as can be seen in FIG. 2. In the illustrative embodiment, this distance is about 4.8 inches (12.2 cm).

The second frustoconical roll 36 is rotatably mounted with respect to the first frustoconical roll 34 so that at both ends of these rolls the distance between them is approximately one inch (2.5 cm). Frustoconical rolls 34 and 36 have the same included angle and each has an apex at the same point as the apex of the other frustoconical cone. Thus rolls 34 and 36 may be spaced farther apart than stated above so long as the apex of the cone of roll 34 and the apex of the cone of roll 36 are at approximately the same point. However, it is most desirable to keep rolls 34 and 36 as close to each other as possible. In the illustrative embodiment, an extension of the axis of cylindrical roll 32 intersects the common apex of frustoconical rolls 34 and 36. This arrangement is convenient, but not necessary.

The first frustoconical roll 34 has a larger diameter at its wider end than that of cylindrical roll 32. The second frustoconical roll 36 is larger in diameter than the first frustoconical roll 34.

Each roll 32, 34 and 36 is provided with a stub shaft 38. Cylindrical heating roll 32 is rotatably driven through its stub shaft 38 by a motor 40 at one axial end and, at its other axial end, has a fixed shaft 42 that extends through a hub 43 and is supported on a trunnion housing 44. The cylindrical roll 32 is composed of aluminum and is covered by a thin coating of TEFLON ® S tetrafluoroethylene, supplied by DuPont. A cylindrical tension roll 50 is loaded either by a tension spring or a hydraulic means to rotate by friction against the outer surface of the cylindrical heating roll 32.

Each frustoconical roll 34 and 36 has a fixed shaft 42 extending through a hub 43 at its end opposite the end provided with stub shaft 38.

The fixed shaft 42 of each roll 32, 34 and 36 receives an inlet pipe 45 that is apertured to provide nozzles 46 extending east, west, north-northeast and north-northwest of the axis of the feed pipe 45 in axially inwardly spaced relation to the hub 43 within the cylindrical heating roll 32 and also receives an L-shaped outlet pipe 47 that has a downwardly extending leg 48 extending into a pool of liquid supplied by the inlet pipe. The stub shaft 38 and hub 43 are fixed to the outer axial walls of the associated roll 32, 34 or 36, hub 43 being axially opposite the motor-driven end of the respective rolls.

The hubs 43 pass through a sealed bearing housing (not shown) to permit each hub 43 and its attached roll 32, 34 or 36 to rotate in unison to permit hot or cold fluid supplied to the respective roll in the inlet pipe 45 to contact the inner circumference of the roll to replace fluid removed through the outlet pipe 47. Only the internal structure of the fluid supply means for roll 36 is illustrated in FIG. 3, but the other rolls 32 and 34 are provided with similar fluid feed and outlet pipes in a similar manner. Also, the rotating support structures for rolls 32, 34 and 36 are similar and operate similarly.

Downstream of the cylindrical heating roll 32, the first frustoconical roll 34 is driven by a second motor 52 through a stub shaft 38 at the axial end corresponding to the driven end of cylindrical heating roll 32 at a minimum peripheral speed equal to that of the roll 32. The other end of the first frustoconical roll 34 is supported in a similar manner to the corresponding end of the cylindrical roll 32 and is provided with similar inlet and outlet pipes for supplying and removing hot liquid into the interior of the first frustoconical roll 34. The taper of the first frustoconical roll 34 is selected to provide a differential stretching of each incremental length of web that forms a relatively small diameter curvature for the portion of the web containing the colored band that passes around the narrow end portion of the frustoconical roll 34 of desired size and a larger diameter curvature for the opposite side of the web portion containing the clear area that passes around the wider portion of the first frustoconical roll 34.

Downstream of the first frustoconical roll 34 is the second frustoconical roll 36 of the same taper approximately as that of roll 34. The roll 36 is driven by a third motor 54 through a stub shaft 38 at the end corresponding to the driven ends of rolls 32 and 34 and also supported at its opposite end in a similar manner to the manner of support for the other rolls 32 and 34. FIG. 3 shows how roll 36 is mounted. The other rolls are similarly mounted but only one drawing is included for the sake of economy. A pair of tapered tension rolls 56 and 58 is shown mounted so that tension roll 56 is biased against the outer surface of the second frustoconical roll 36 and, if desired, an optional additional tension roll 58 (shown in phantom) is biased against tension roll 56. The mountings for roll 56 and optional roll 58 are omitted from the drawings for clarity, but are similar to those shown for roll 29 in U.S. Pat. No. 3,019,475 to Smith. Preferably, tension roll 56 and optional additional tension roll 58 have an apex at the same point as rolls 34 and 36. Inlet and outlet pipes 45 and 47 are provided for the second frustoconical roll 36 to provide cold liquid flow into and removal from its interior whereas the inlet and outlet pipes provide hot fluid flow for the cylindrical roll 32 and for the first frustoconical roll 34. The speed at which the respective motors 40, 52 and 54 operate is individually adjusted to insure that the web 30 does not wrinkle. Generally, each succeeding motor in the downstream path operates to rotate its associated roll at a slightly higher peripheral speed than the preceding roll.

As shown in FIG. 2, the web 30 from roll 27 or roll 31 is entrained in a counterclockwise direction around the cylindrical tension roll 50 and then in a clockwise direction around the circumference of the cylindrical heating roll 32 and then around the circumference of the first frustoconical roll 34 in a counterclockwise direction and then around the circumference of the second frustoconical roll 36 in a clockwise direction and around tapered tension roll 56 in a counterclockwise direction into and through the nip between the tapered tension rolls 56 and 58, if optional tension roll 58 is included. The rolls 32, 34 and 36 are located with respect to each other and rolls 50 and 56 are located with respect to rolls 32 and 36 so that each portion of web 30 moves in contact with rolls 32, 34 and 36 for a major portion of the revolution of the surfaces of these rolls. This contact with rolls 32, 34 and 36 is preferably equal to about ¾ of the revolution of their surfaces. A guide bar 60 (whose support is omitted from the drawings for clarity) is located downstream of the second frustoconical roll 36 to receive the continuous web 30 in such a position that the web 30 clears the second frustoconical roll 36. If optional tension roll 58 is omitted, the web 30 moves directly from tapered tension roll 56 to the guide bar 60. Preferably, guide bar 60 is positioned along an axis that intersects the common apex of frustoconical rolls 34 and 36.

Despite the use of several tension rolls 50, 56 and 58 in the differential web stretcher 14, which maintain the web 30 in axial alignment relative to the rolls 32, 34 and 36 while passing through the differential web stretcher 14, if the web moves directly into a web cutting machine exactly conforming to that disclosed in the aforesaid Rosenthal patent, the web would tend to veer so that it would become misoriented with the cutting element of the web cutting machine. This misalignment, while trivial for each cycle, accumulates from cycle to cycle. It is believed to be caused by the fact that the differentially stretched web has one arcuate side longer than the other arcuate side so that the web would tend to move transversely, usually toward the shorter curved side, en route from the guide bar 60 directly into an intermittently operated drive for the web cutting machine 14.

In order to maintain proper entry of the arcuately shaped length of web 30 into the web cutting machine that operates intermittently, the present invention has found it necessary to interpose a web alignment device 16 of the type to be described between the differential web stretcher 12 and the web cutting machine 14 and to replace the cylindrical drive roll of the commercially available web cutting machine with a tapered drive roll 90. For best results, the taper of the drive roll for the web cutting machine should approximate the taper common to the frustoconical rolls 34 and 36 and the tapered tension rolls 56 and 58. However, adequate results ensue when the taper of the driving roll for the web cutting machine is slightly shallower than the taper of the tapered rolls 34, 36, 56 and 58 of the continuous stretching machine, provided a self-aligning device of the present invention is included in proper position to intercept the arcuate path of movement of the differentially stretched web.

It is also desirable to orient the axis of the tapered drive roll 90 of the altered web cutting machine so that the upper tangent of the tapered drive roll 90 for the web cutting machine 14 lies in a plane common to the given plane occupied by the axes of cylindrical roll 32 and the second frustoconical roll 36. This given plane is essentially horizontal for purposes of convenience. Adequate results are obtained when the axis of the tapered drive roll 90 is close to the common apex for the frustoconical drive rolls 34 and 36 even though they are not exactly coincident.

The web aligning device 16 comprises an H-shaped base comprising a cross beam 70 interconnecting a pair of end beams 72. Each end beam 72 supports the bottom of a vertical guide post 74. Each of the latter is provided with a member having an interior vertical slot 76. A floating rod 78 is provided with a caster 80 at each end to permit the floating rod 78 to ride along the vertical slots 76 with the vertical guide posts 74 controlling the axial movement of the ends of the rod 78. The web aligning device 16 is preferably oriented so that a vertical plane common to the slots 76 extends normal to the tangents to the opposite sides of an arcuate path taken by the differentially stretched web 30 passing under the rod 78 when the web is properly aligned and oriented. This arrangement controls the floating movement of rod 78 in a vertical plane that is normal to the tangents of the arcuate side edges of the differentially stretched web. Brackets 82 and 83 are adjustably fixed to opposite vertical guide posts 74 at different elevations. Bracket 83 serves as a stop member to limit the downward movement of one end portion of the floating rod 78. The other bracket 82 has connected to its inner end a housing 84 supported on a holding plate 85. Switch means in the form of a limit switch 86 extends from the housing 84 for engagement by floating rod 78 in spaced relation to the end that engages stop member 83.

Another feature of the present invention is the provision of a pair of storage brackets 79 supported by each of the vertical guide posts 74. The free floating rod 78 may be stored by support on the brackets 79 between the vertical guide posts 74 when the apparatus is not in use.

Stop member 83 is positioned along one vertical guide post 74 at a higher elevation than the position of limit switch 86. The respective positions of the stop member 83 and the limit switch 86 are arranged in such relative locations that the floating rod 78 is oriented to extend obliquely downward transverse to the path of the looped portion of the web 30 between the continuous differential web stretcher 12 and the automatic web cutter 14 when it simultaneously engages both the stop member 83 and the limit switch 86 as to compensate for any transverse pulling of the arcuate length of looped portion of the web by the drive roll 90 of the web cutter 14 during each cycle. Floating rod 78 is constrained to move in such a manner that its axis either points to the common apex for frustoconical rolls 34 and 36 or to a point either subtending or subtended by said common apex.

The continuous web 30 is mounted under the floating rod 78 between the differential web stretcher 12 and the web cutting machine 14. The differentially stretched web 30 has its leading edge portion at the web cutting station 14 clamped to the drive roll 90 with a very short length beyond the drive roll 90.

The modified web cutting station 14 comprises a tapered drive roll 90 having a taper either approximately or slightly less than the taper common to frustoconical rolls 34 and 36. Roll 90 is driven intermittently when limit switch 86 is actuated for a period determined by an electronic timer 93 through a tapered drive roll actuating motor (not shown). A plurality of axially spaced hold down rolls 92 is biased to engage the web 30 against the upper surface of the tapered drive roll 90. A cutting device immediately downstream of the tapered drive roll 90 comprises a cutting blade 94 actuated by cam means 95 and a cutting block 96. The cutting blade extends parallel to the vertical tangential plane of said tapered drive roll 90 and is actuated to slice across the web 30 after the loop of the web has moved for a predetermined time through the nip between the tapered drive roll 90 and the hold down rolls 92. The cutting blade 94 may be mounted either above or below the cutting block 96 and moves through the thickness of web 30 to cut the latter.

A slanted table 97 has an upper apertured top 98 slanted downwardly in a downstream direction from the web cutting machine 14 to permit the cut lengths of flexible interlayer material to slide out of the way of the cutting knife 94. A collection table 99 is provided near the lower end of slanted table 97.

As stated earlier, the tapered drive roll 90 is preferably located in such a position that its upper tangent lies in a plane common to the common plane of the axes for the frustoconical roll 36 and the cylindrical roll 32. Preferably, this plane is horizontal. However, this criterion need not be followed, provided the upper tangential plane for the tapered drive roll 90 is the plane at which the transverse dimension of the web 30 extends horizontally across the second frustoconical roller 36.

A Cycle of Operation

Figure 7:
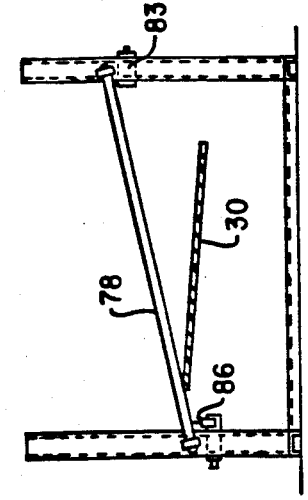
FIG. 7 is a schematic elevational view of the alignment device of FIG. 4 in operation showing the position of a floating rod thereof that rests on a loop of the web to engage the loop at a proper orientation when it engages switch means to start operation of a tapered roll drive for the web cutting equipment.

Referring to FIGS. 7-11, a typical cycle of operation is shown. In FIG. 7, the floating rod 78 resting across the upper surface of web 30 to form a tensioned enlarged loop from its support on stop 83 has just engaged the limit switch 86 on its downward movement to start the operation of the tapered drive roll 90 of the web cutting machine 14. The roll 90 rotates at a faster peripheral speed than the speed of the web 30 through the nip between rolls 36 and 56. It is understood that the time during which the tapered roll 90 is rotated at a speed to move the web through the nip between the tapered drive roll 90 and the hold down rolls 92 at said faster speed is controlled by the electronic timer 93 to obtain an appropriate length of web 30 coordinated with the length of an interlayer sheet needed to form a laminated windshield.

Figure 8:
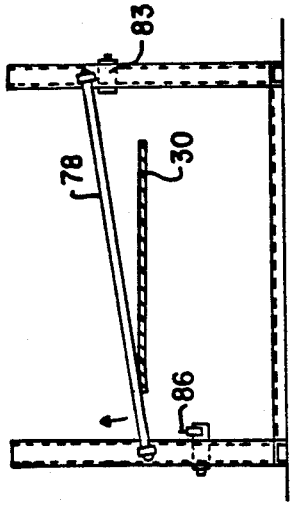
FIG. 8 is a view similar to FIG. 7, taken shortly thereafter, showing how the length of the loop of plastic web is shortened between the continuous stretching apparatus and the intermittent web cutting apparatus due to faster peripheral speed of the driving roll of the web cutting apparatus than the rolls of the web stretching apparatus, thereby beginning to lift and tilt the floating rod of the alignment device of the present invention.

In FIG. 8, the tapered drive roll 90 is pulling the length of the web from the loop at a faster rate than the loop is fed from the nip between the tapered tension rolls 56 and 58 or between rolls 36 and 56 if roll 58 is omitted, so that the loop formed from the web portion supporting the floating rod 78 shortens. This raises the portion of the floating rod spaced from the stop member 83 while the other end of the rod continues to rest on stop member 83. The floating rod 78 thus tends to displace the web 30 to the right and/or counteract the effect of the web to veer to the left as the drive roll 90 pulls the loop to decrease the loop length.

Figure 9:
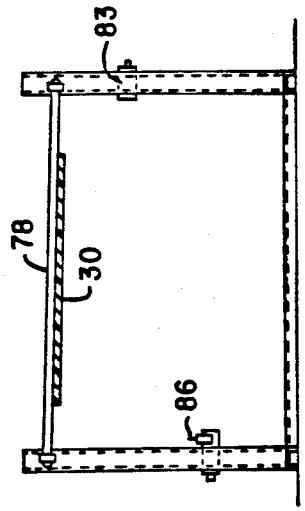
FIG. 9 shows the relative position of the plastic web and the floating rod of the alignment mechanism of the present invention at the moment that the drive roll of the web cutting machine stops and the web is cut.

FIGS. 8 and 9 show the effect of shortening the web in the intervening space between the differential web stretcher 12 and web cutting machine 14. When both ends of the floating rod 78 are disengaged from stop member 83 and switch means 86, the downward force of the rod against the web 30 tends to equalize along the width of the web and the rod assumes an orientation parallel to the orientation of the moving web. The weight of the floating rod holds the loop of the web 30 in unwrinkled condition.

The loop of the web 30 becomes shorter and shorter until the amount of length of the web that has passed the cutting blade 94 is an appropriate length. At this time, depicted in FIG. 9, the drive motor for the tapered drive roll 90 stops and the cutting blade 94 is actuated. A suitable length of plastic is separated from the web and slides down the slanted table 97 with air being blown through the apertures in the apertured top 98 of the slanted table 97 to separate the suitable length from the balance of the web.

Figure 11:
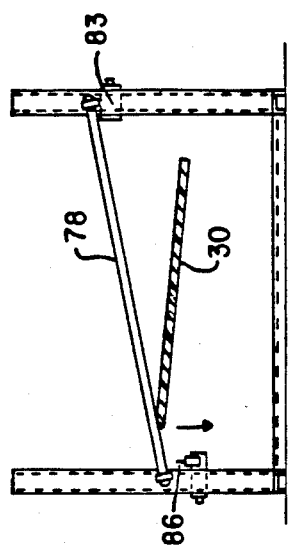
FIG. 11 is a view similar to FIG. 10 taken shortly thereafter showing how the one end of the floating rod engages said stop while the other portion of the bar continues to move toward the limit switch and approach a proper orientation to hold the loop taut and in proper alignment for entry into the web cutting apparatus to initiate another cycle of movement of an additional appropriate length of web through the driving roll of the web cutting machine.
Figure 10:
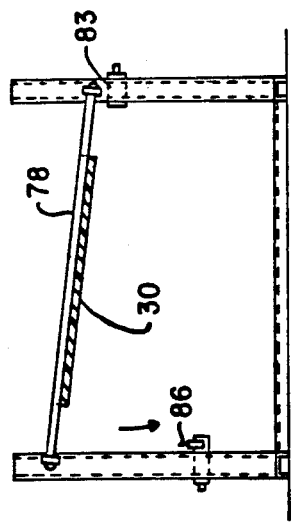
FIG. 10 is a view similar to FIG. 9 taken shortly thereafter showing what happens when the floating rod is partially lowered with its end engaging the longer side of the loop approaching an adjustable stop while a portion of the floating rod spaced from said end approaches the switch means after the drive roll for the web cutting machine has stopped for the web cutting step and the continuous web stretching equipment continues to feed the web at a constant speed therethrough to increase the length of the loop and, if the entire system is not precisely aligned, to cause the loop to veer transverse to its path of movement.

Even though the motor driving the tapered drive roll 90 of the web cutting machine 14 is stopped, the rolls of the differential web stretcher 12 continue to rotate to differentially stretch the next length of the continuous web 30. This enables the floating rod 78 to lower in response to gravity and force the loop of the web 30 to remain unwrinkled as its length increases. When the one end of the floating rod 78 engages the higher stop member 83, the other side of the floating rod 78 continues to lower toward the switch means 86. The phase of a cycle just described is depicted in FIG. 10. At this time, the front end of the loop remains gripped in proper transverse alignment against the stopped drive roll 90. After the floating rod 78 of the alignment means engages the higher stop member 83 and moves toward the switch means 86 at its other end, as depicted in FIG. 11, the web remains unwrinkled and in position for the floating rod 78 to realign the web transversely of the path of movement as the loop of the web enters the cutting machine if such realignment is needed.

The transverse alignment takes place in response to the tapered drive roll 90 of the web cutting machine 14 starting to operate to pull the curved length of web 30 in a straight line. The shortening loop of the web 30 lifts the floating rod 78 to cause the transverse displacement of the web counter to the veer that would occur in the absence of the free floating rod and stop means. When a transverse realignment takes place during each cycle, using the alignment device of the present invention prevents the realignment needed from becoming too large to handle with ease.

The exact positions of adjustment for switch means 86 and stop member 83 depend on the length to be cut from the web and the curvature of the line of demarcation between the colored and clear portions of the web. Also, the orientation of the alignment device 16 as determined by the vertical plane common to the vertical slots 76 is adjusted depending on the radius of curvature of the line of demarcation so that the alignment device 16 has its common vertical plane normal to the tangents to the curved side edges of the moving web 30 in the vicinity of the unwrinkled loop held taut by floating rod 78.

The present invention provides means to enable the differentially stretched continuous web of plastic interlayer material to be cut into suitable lengths automatically without requiring additional personnel which was needed prior to the present invention. It also avoids the results of the web veering slightly during each cycle to offset the web in a transverse direction. If each length cut from the web cutting machine 14 causes a transverse displacement of ¼ inch (6 mm), the angularity of the cut because of the arcuate nature of the length being cut from the continuous web would become more and more pronounced if it were not for the realignment of the web between each successive cutting operation that the present invention provides. Therefore, it is possible to maintain a web of flexible material that is differentially stretched by passing continuously through a differential web stretcher en route to a web cutting machine where a suitable length of web is moved rapidly past a cutting knife and stopped intermittently for cutting and then moved more rapidly than the movement through the differential web stretcher.

The setting of the relative positions of the stop member 83 and the switch means 86 depends on the diameter of curvature imparted to the line of demarcation between the shaded and clear portions of the web. Since a narrow band of shading is provided along the length of the web, it has been found convenient to measure the radius or diameter of the short arcuate edge of the differentially stretched web instead.

For webs having widths of about 36 inches (91 cm) moved approximately centrally of the rolls, a differential curvature incorporating a curve having a radius of 130 inches (330 cm) along its shorter edge was developed using a cylindrical roll 47 inches (119 cm) long and 20 inches (51 cm) in diameter rotating at approximately 6 revolutions per minute and supplied with hot oil at 260° F. (127° C.) at 14 gallons per minute (3.18 cubic meters per hour), a first frustoconical roll 47 inches (119 cm) long having a large diameter to small diameter ratio of 1.4 from end to end including a diameter of approximately 19 inches (48 cm) at its smaller driven end and a diameter of approximately 26 inches (66 cm) at its larger end also rotating at approximately 6 revolutions per minute to differentially stretch the moving web and fed with the same hot oil at the same rate as the cylindrical roll and a second frustoconical roll 47 inches (119 cm long having a large diameter to small diameter ratio of 1.4 from end to end including a diameter of approximately 28 inches (71 cm) at its smaller driven end and a diameter of approximately 38 inches (97 cm) at its larger end and rotated at approximately 4 revolutions per minute and fed with a glycol-water mixture at 40° F. (5° C.) at a rate of 25 gallons per minute (5.68 cubic meters per hour). The web developed a temperature of approximately 190° F. (88° C.) on leaving the cylindrical roll, approximately 215° F. (102° C.) on leaving the first frustoconical roll and approximately 63° F. (17° C.) on leaving the second frustoconical roll. The tapered drive roll for the cutting machine was 2 inches wide at its wider end, was approximately 47 inches long and had a diameter ratio of 1.4. After one day of standing at room temperature, the radius of the shorter edge, which was measured immediately after differential stretching and cutting, increased from 130 inches (330 cm) to 135 inches (343 cm). Chordal lengths of 54 inches (137 cm) along the shorter curved edge cut from the continuously stretched webs aligned with the floating rod 78 of the web alignment device 16 extending normal to the arcuate path of the web through the alignment station did not alter in dimensions perceptibly after the first day so that loss of excess trim could be reduced by giving the differentially stretched lengths of plastic at least one day to normalize before assembling the length of interlayer material between matched curved glass sheets.

It is a simple matter to adjust the positions of the alignment device 16 and the automatic cutting device 14 when it becomes necessary to cut lengths of plastic differentially stretched to provide lines of demarcation of different radii of curvature from a previous production pattern. The new positions are coordinated with frustoconical rolls of different taper from those required for the previous production pattern. Having the cylindrical roll 20 and the replacement second frustoconical roll 36 mounted on horizontal axes makes it unnecessary to change the vertical position of the tapered driving roll 90 of the automatic web cutting machine 14.

The form of the present invention shown and described in this disclosure represents an illustrative embodiment thereof. It is understood that various changes may be made without departing from the gist of the invention as defined in the claimed subject matter which follows.

I claim:

1. Apparatus for stretching, aligning and cutting a continuous web of arcuately shaped, flexible material comprising:

a differential web stretching station having first drive means to move said web at a continuous first speed along a curved path;

a cutting station positioned along said curved path, spaced from said stretching station, said cutting station having a web cutting means;

second drive means;

timer means acting on said second drive means to intermittently drive a given length of web through said cutting station at a second speed greater than said first speed and acting on said web cutting means to cut a piece of a predetermined length from said web; and a web aligning device between said stretching station and said cutting station, said aligning device comprising:

a pair of guide posts oppositely disposed on each side of said path;

a rod;

means for slidably mounting an end portion of said rod in each of said posts for movement from a first position in overlying relation to the upper surface of the path defined by the web as said web moves from said stretching station into said cutting station, towards and away from a second position in overlying relation to the upper surface of the path defined by a loop of the web as the web moves from said stretching station toward but not into said cutting station;

stop means mounted at a first level in the path of a first end portion of said rod as the first rod end portion moves from the first position to the second position; and switch means operatively connected to said second drive means and said timer means and mounted at a second level vertically lower than said first level, in the path of a second portion of said rod as the second rod end portion moves from the first position to the second position;

wherein the length of the loop increases to move said rod from the first position towards the second position when said second drive means is inactivated by said timer means, to move said first rod end portion into engagement with said stop means, to pivot said second rod end portion about said stop means into engagement with said switch means to activate said second drive means, to activate said timer means as said second drive means is activated, to move the web into the cutting station at said second speed to decrease the length of the loop, to pivot the second rod end portion about said stop means away from said switch means, to continue to move the rod toward the first rod postion and thereafter move the first rod end portion away from the stop means as the rod continues to move toward the first rod position wherein the web, as in the loop decreases, engages the second rod end portion, the rod portion between the first and second rod portions and thereafter the first rod end portion to provide tension on the web and to maintain web alignment as said second drive means moves a predetermined length of web into said cutting station after which said timer means inactivates said second drive means and activates cutting means to cut a piece of web having a predetermined length.

2. Apparatus as in claim 1 wherein said differential web stretching station includes a continuously rotating frustoconical web engaging roll for moving said web at said first speed.

3. Apparatus as in claim 2 wherein said slideable mounting means includes vertical slots in each of said posts in facing relationship to each other, said vertical slots located in a vertical plane that intersects the apex of said frustoconical roll to constrain the movement of said floating rod to a vertical plane.

4. Apparatus as in claim 2 wherein said second drive means of said cutting apparatus is a tapered drive roll.

5. Apparatus as in claim 4, wherein said frustoconical web engaging roll is the downstream roll of a pair of frustoconical rolls located at the downstream end of said differential web stretcher, said pair of furstoconical rolls having equal conical angles, each of said pair of frustoconical rolls forming the frustum of a cone having a common apex and said tapered roll of said web cutting apparatus having a conical angle approximating those of said pair of frustoconical rolls of said continuous differential web stretcher and an apex adjacent the common apex of said pair of frustoconical rolls.

6. Apparatus as in claim 5, wherein said vertical slots are disposed in a vertical plane that intersects the common apex of said pair of frustoconical rolls to constrain the movement of said floating rod in said vertical plane.

7. Apparatus as in claim 5, wherein said downstream roll of said pair of frustoconical rolls has its axis in a horizontal plane and said tapered drive roll has an upper tangential plane in said horizontal plane.

* * * * *

UNITED STATES PATENT AND TRADEMARK OFFICE
CERTIFICATE OF CORRECTION

PATENT NO. : 4,554,713

DATED : November 26, 1985

INVENTOR(S) : Joseph Chabal

It is certified that error appears in the above-identified patent and that said Letters Patent is hereby corrected as shown below:

Column 14, line 7 "postion" should read --position--.

Column 14, line 10 "in" should be deleted.

Column 14, line 14 "weh" should read --web--.

Column 14, line 35 "furstoconical" should read --frustoconical--.

Signed and Sealed this

Fourth Day of March 1986

[SEAL]

Attest:

DONALD J. QUIGG

Attesting Officer

Commissioner of Patents and Trademarks